United States Patent [19]

Lo

[11] Patent Number: 5,042,330
[45] Date of Patent: Aug. 27, 1991

[54] KEY MANUFACTURING METHOD

[76] Inventor: Jian P. Lo, No. 3, Lane 62, Hou Kang Street, Shihlin District, Taipei, Taiwan

[21] Appl. No.: 538,406

[22] Filed: Jun. 15, 1990

[51] Int. Cl.$^5$ ............................................. B21K 13/00
[52] U.S. Cl. .................................. 76/110; 76/DIG. 3
[58] Field of Search .................. 76/110, 101, DIG. 3; 70/403, 404, 409

[56] References Cited

U.S. PATENT DOCUMENTS

| 225,227 | 3/1880 | Mathes | 76/110 |
| 2,301,531 | 11/1942 | Flak | 76/110 |
| 3,464,294 | 9/1969 | Kerr | 76/110 |
| 4,735,069 | 4/1988 | Steinbach | 76/110 |

FOREIGN PATENT DOCUMENTS

| 2404089 | 5/1979 | France | 70/409 |
| 472675 | 6/1952 | Italy | 76/110 |
| 18242 | 1/1985 | Japan | 76/110 |

Primary Examiner—Roscoe V. Parker
Attorney, Agent, or Firm—Bacon & Thomas

[57] ABSTRACT

A key manufacturing method, which includes a first procedure to produce key bodies through material shape molding, side-edge cutting process, thickness, curvature and length milling process, bitting forming process, and numbering and classification process according to shape of bitting; a second procedure to produce sheaths through copper rod planing process, conical front end milling process, groove lathing process and opposite inner wall trimming process; and a third procedure to fixedly fasten a key body in a sheath to form a unitary round key.

3 Claims, 4 Drawing Sheets

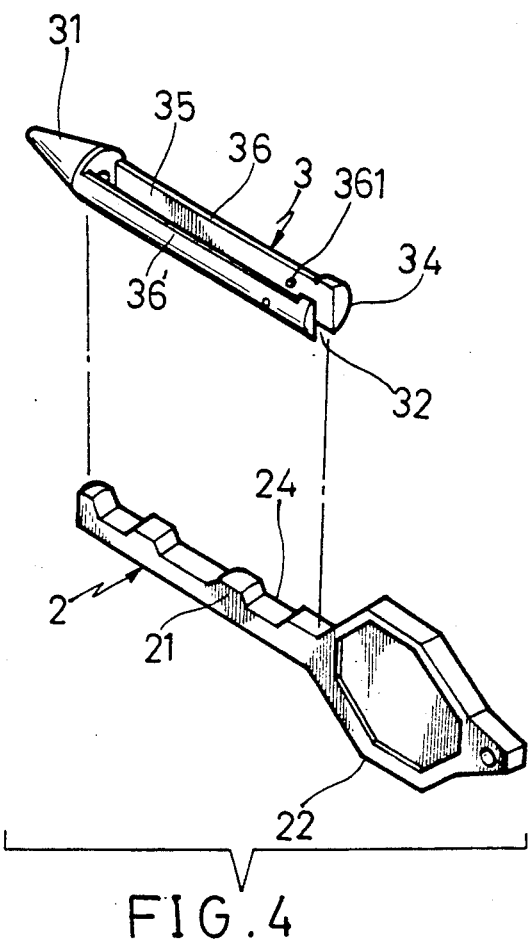
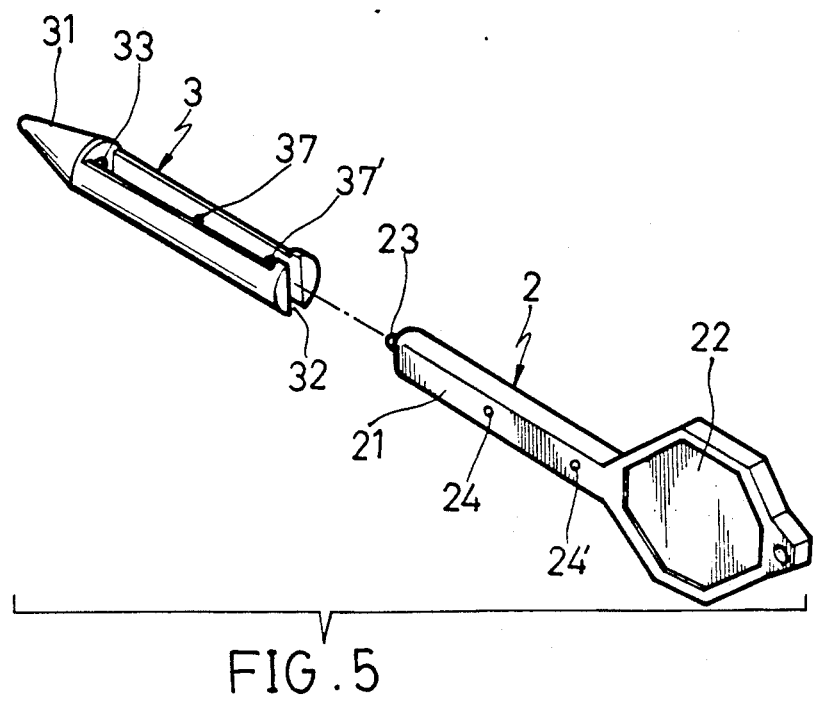

KEY MANUFACTURING METHOD

BACKGROUND OF THE INVENTION

The present invention is to provide a manufacturing method for manufacturing round keys through mass production.

FIG. 1 illustrates a round key for moving the bolt of a lock, which is generally comprised of a key rod 11 extending from a bow 1. The key rod 11 is milled or drilled to form two opposite inner walls 13, 13' defining therebetween a bitting 12 for driving the bolt of a lock. According to a conventional manufacturing process, a key rod is first drilled according to a pre-determined pattern to form a bitting therein along an axial direction. After the formation of the bitting 12, the key rod 11 is further trimmed to form two opposite, vertical inner walls 13, 13' at both sides of the bitting 12. By means of the bitting 12 matching with the two opposite inner walls 13, 13', the bolt of a corresponding lock is smoothly moved to lock or unlock a door or similar appliance. The disadvantage of this conventional round key manufacturing process is its low production efficiency which cannot achieve mass production. According to the aforesaid manufacturing process, only a few pieces of round keys can be produced at a time. More particularly, the surface trimming process must be made manually piece by piece. There is a kind of computer-controlled round key manufacturing machine for manufacturing round keys more efficiently. However, the cost of this kind of computer controlled round key manufacturing machine is very expensive and the round keys produced by such a machine must be surface trimmed by manual labor. Therefore, this computer controlled round key manufacturing machine still can not satisfy the requirement for integral mass production.

SUMMARY OF THE INVENTION

The present invention has been realized with the following objectives. It is an object of the present invention to provide a round key manufacturing method for manufacturing round keys automatically through mass production. According to the present invention, a round key manufacturing method includes a first procedure to produce a key body, a second procedure to produce a sheath and a last procedure to couple the key body with the sheath. The first procedure includes a material shape molding process through pressure die casting, a side-edge cutting process, a thickness, curvature and length milling process and a bitting forming process. After production, the key bodies are numbered and classified according to the shape of bitting. The second procedure includes a copper rod planing process, a conical front end milling process, a groove lathing process and an opposite inner wall trimming process. The third procedure is to secure a key body in a sheath to form an unitary round key.

BRIEF DESCRIPTION OF THE DRAWINGS

FIG. 4 is a perspective fragmentary view of a second embodiment of a round key made according to the present invention;

FIG. 5 is a perspective fragmentary view of a third embodiment of a round key made according to the present invention;

DETAILED DESCRIPTION OF THE PREFERRED EMBODIMENTS

Figure 2:
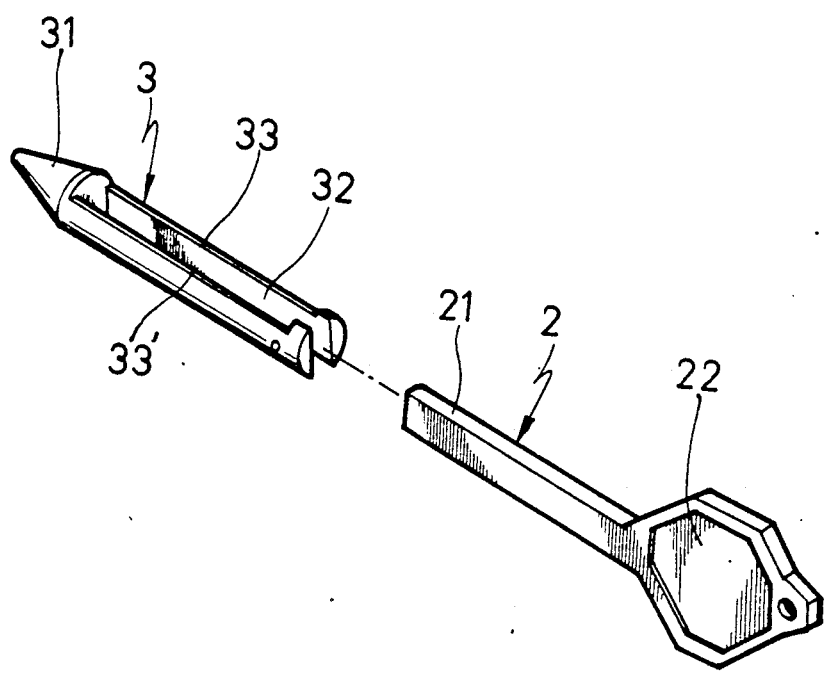
FIG. 2 is a perspective fragmentary view of a first embodiment of a round key made according to the present invention.

FIG. 2 illustrates a key 1 made according to the present invention, which is generally comprised of a key body 2 and a sheath 3. As illustrated, the key body 2 comprises a key rod 21 extending from a bow 22.

Figure 3:
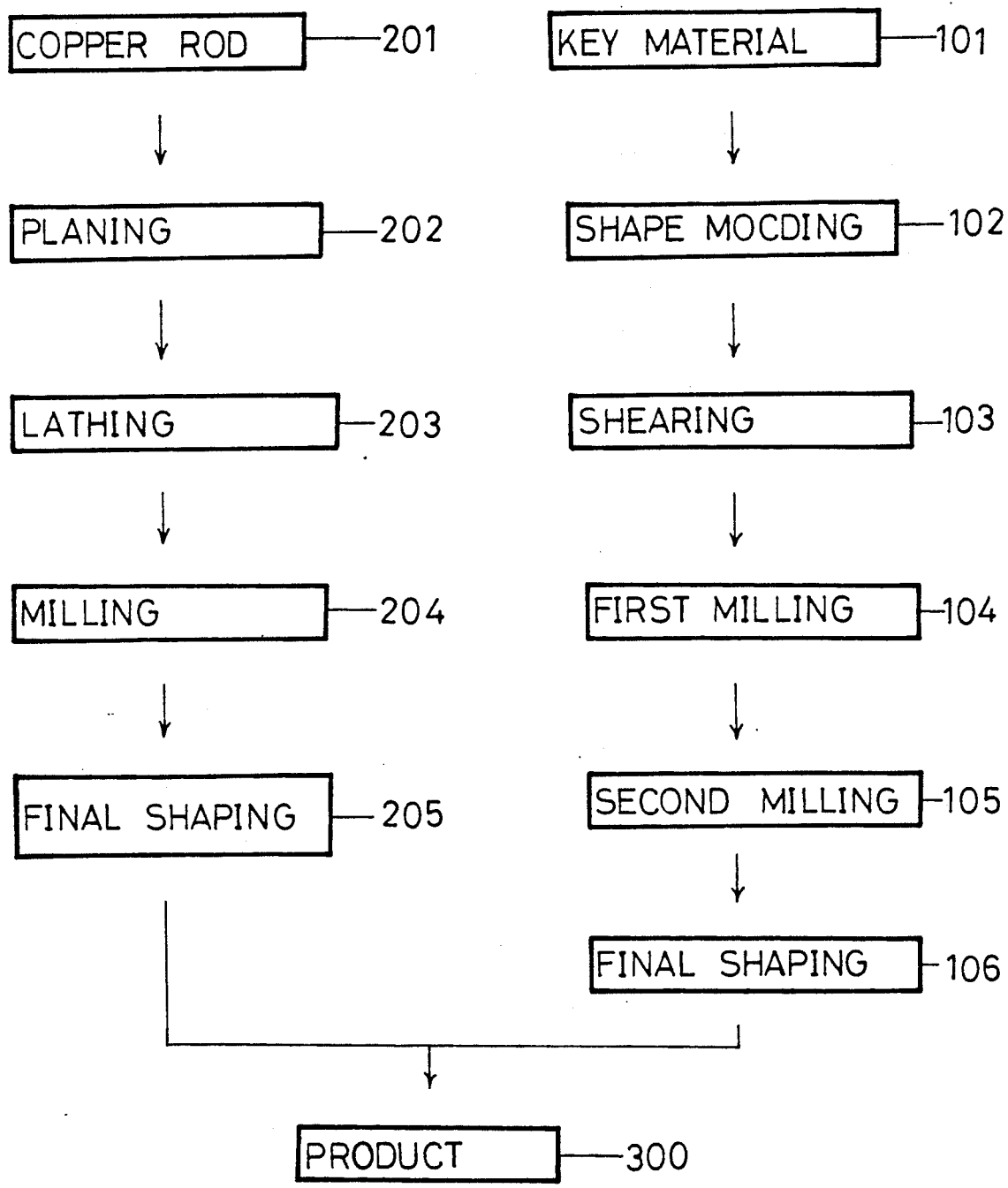
FIG. 3 is a manufacturing flow chart according to the present invention.

The key body manufacturing process is outlined hereinafter with reference to the drawings of FIGS. 2 and 3. After the feeding of material (101), the material is shape molded into a plurality of crude key bodies through a pressure die casting or punching process (102) and the side-edge of each shape formed crude key body is properly cut through a shearing process (103). After the shearing process (103), the crude key bodies are respectively milled into a pre-determined thickness and curvature (104), and then milled into a pre-determined length (105). The shape molded crude key bodies, after having been properly milled, are further punched or milled to provide a bitting according to a pre-determined shape (106). Thus, a plurality of key bodies 2 are completely finished. During this manufacturing process, several pieces or several tens of pieces of crude key bodies can be simultaneously punched or milled to provide the same shape of bitting, i.e. a big quantity of key bodies are produced as a lot. After several lots of key bodies are produced, the finished key bodies are numbered and classified according to the shape of bitting.

Referring to FIGS. 2 and 3 again, the sheath manufacturing process is outlined hereinafter. A raw copper rod (201) is planed (202) and lathed (203) to form a conical front end 31. The copper rod is further milled (204) to form a groove 32 extending longitudinally through its body. After the formation of the groove 32, the two opposite inner walls 33, 33' of the groove 32 are respectively ground (205) into smooth surfaces.

Figure 6:
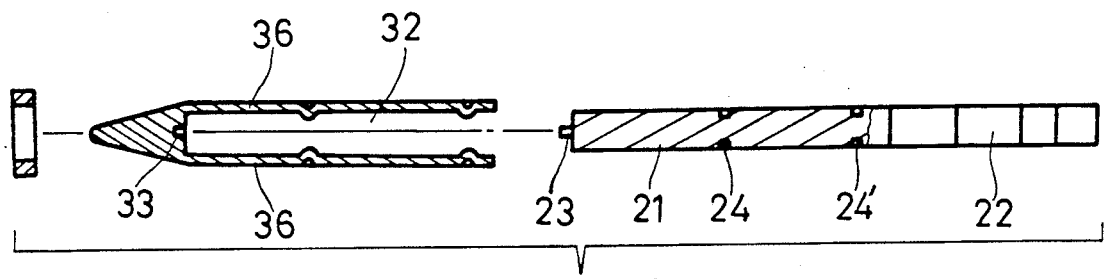
FIG. 6 is a sectional fragmentary view of a fourth embodiment of a round key made according to the present invention.
Figure 7:
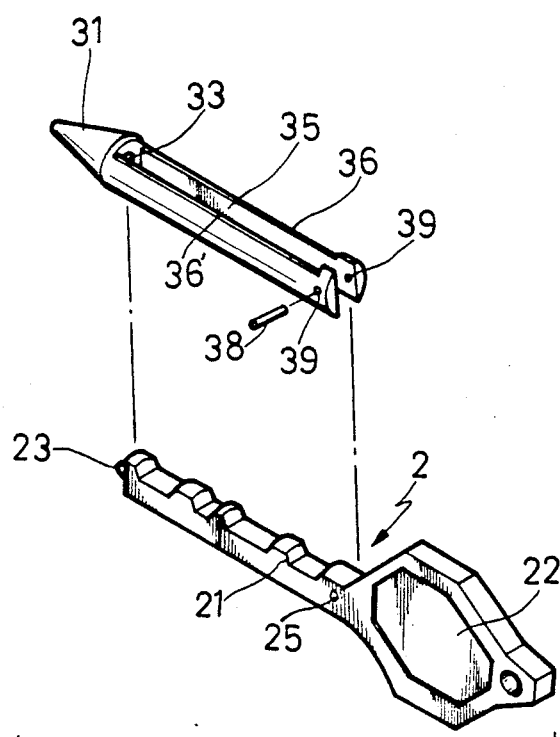
FIG. 7 is a perspective fragmentary view of a fifth embodiment of a round key made according to the present invention.

After key bodies 2 and sheaths 3 are respectively made, a key body 2 is coupled with a sheath 3 to form a finished product (300). The coupling of a key body 2 with a sheath 3 may be made through various methods including:

A. By means of a point welding process as shown in FIGS. 5 and 6;

B. By means of a pin joint as shown in FIG. 7;

C. By means of a snap joint as shown in FIG. 4;

D. By means of a doweled joint; and

E. By means of a melting or other suitable fastening process.

Referring to FIG. 4, the key body 2 has a key rod 21 extending from a bow 22 and defining therewith a shoulder 24. The sheath 3 comprises a conical front end 31, a groove 32 longitudinally extending through its body and defining therewith two opposite, vertical inner walls 36, 36'. During assembly, the rear opening 34 of the sheath 3 is mounted on the shoulder 24 of the key body 2 and the sheath 3 is moved upwardly to permit the key rod 21 to be squeezed into the groove 32 of the sheath 3. The two opposite, vertical inner walls 36, 36' have a plurality of raised portions 361 thereon so that the key body 2 and the sheath 3 can be rigidly secured together through a welding connection. Thus, a gap 35 is defined between the key body 2 and the sheath 3 inside the groove 32. By means of the bitting 25 of the key body 2 matching with the two vertical inner walls 36, 36' in the gap 35 of the sheath 3, the bolt of a corresponding lock can be efficiently moved for locking or unlocking a door or similar appliance.

Referring to FIGS. 5 and 6, the key rod 12 of the key body 2 has two recesses 24, 24' each on its both side walls and a front pin 23, and the sheath 3 has two raised portions 37, 37' on both inner walls corresponding to the recesses 24, 24' of the key body 2 and a hole 33 on the back side of its front conical end 31 corresponding to the front pin 23 of the key body 2. After the key rod 21 of the key body 2 is inserted in the groove 32 of the sheath 3 to permit the front pin 23 to set in the hole 33 and the raised portions 37, 37' to set in the recesses 24, 24', the sheath 3 and the key body 2 are securely connected together by means of a point welding process.

Referring to FIG. 7, the sheath has a hole 33 on the back side of its front conical end 31 and a pair of pivot holes 39, 39' through its rear end, and the key body has a front pin 23 on its front end and a pivot hole 25 through the shoulder of its key rod 21. During assembly, the key rod 21 is inserted in the sheath 3 with its front pin 23 set in the hole 33 of the sheath 3 to permit the pivot hole 25 of the key body 2 to be in alignment with the pivot holes 39, 39' so that a pin 38 can be inserted in the pivot holes 25, 39, 39' to secure the sheath 3 to the key body 2.

Figure 1:
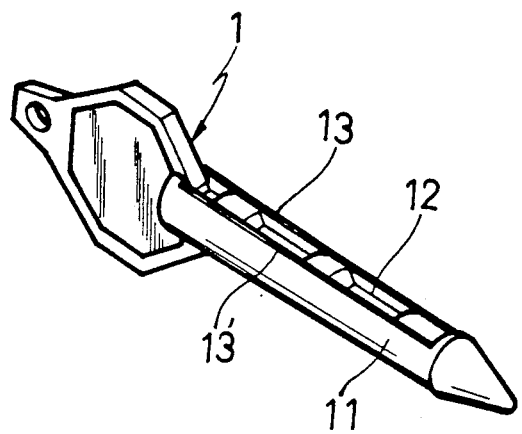
FIG. 1 is a perspective view of a round key made according to the conventional manufacturing process.

The combination of a sheath with a key body may be made through another fastening process. As an alternate form of the present invention, a sheath and a key body may be separately made through a dewaxing process, a power metallurgical process or a pressure die casting process for further assembly through a point welding, melting, punching or doweled joint process. After assembly through either of the forgoing processes, the outer appearance of a round key according to the present invention is just the same as to the round key of FIG. 1 which is made according to the conventional manufacturing process.

I claim:
1. A key manufacturing method, comprising:
   a key body manufacturing procedure comprising a first process to feed material, a second process to mold said material into a pre-determined shape through pressure die casting to form a crude key body, a third process to cut the side edge of said crude key body, a fourth process to mill said crude key body into thickness, curvature and length according to pre-determined specifications, a fifth process to mill a bitting on said crude key body, and a sixth process to number and classify the key body thus formed according to the shape of bitting;
   a sheath manufacturing procedure comprising a process to plane a copper rod, a process to mill a conical front end on said copper rod, a process to lathe a groove piercing through said copper rod, and a process to trim two opposite inner walls in said groove; and
   a key body and sheath combining procedure being to fasten a key body obtained from said key body manufacturing procedure in a sheath obtained from said sheath manufacturing procedure to form an unitary key.

2. A key manufacturing method as claimed in claim 1, wherein said key body manufacturing procedure is to produce a plurality of key bodies of same shape of bitting at a time.

3. A key manufacturing method as claimed in claim 1, wherein said key body and sheath combining procedure is to fasten a key body in a sheath by means of point welding process, pin joint, doweled joint, rivet joint or punching process.

* * * * *